US012657087B2

(12) United States Patent
Chen et al.

(10) Patent No.: US 12,657,087 B2
(45) Date of Patent: Jun. 16, 2026

(54) PARAMETER DRIVEN DYNAMIC DISASTER RECOVERY

(71) Applicant: Salesforce, Inc., San Francisco, CA (US)

(72) Inventors: Bohan Chen, San Francisco, CA (US); Donald Tam, San Francisco, CA (US); Rita Yung, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 18/542,265

(22) Filed: Dec. 15, 2023

(65) Prior Publication Data

US 2025/0199911 A1     Jun. 19, 2025

(51) Int. Cl.
G06F 11/00     (2006.01)
G06F 11/14     (2026.01)
G06F 11/20     (2006.01)
G06F 11/30     (2006.01)
(52) U.S. Cl.
CPC ...... G06F 11/1402 (2013.01); G06F 11/2094 (2013.01); G06F 11/3086 (2013.01)

(58) Field of Classification Search
CPC .. G06F 11/2094; G06F 11/202; G06F 11/203; G06F 11/2056; G06F 11/2089; G06F 11/2092
See application file for complete search history.

(56) References Cited

U.S. PATENT DOCUMENTS

| | | | |
|---|---|---|---|
| 9,274,903 B1* | 3/2016 | Garlapati | ............ G06F 11/2038 |
| 2020/0026571 A1* | 1/2020 | Bahramshahry | ...... G06F 9/5005 |
| 2022/0035574 A1* | 2/2022 | Cain | ..................... G06F 3/0613 |
| 2022/0050858 A1* | 2/2022 | Karr | ................... G06F 11/3466 |
| 2023/0095756 A1 | 3/2023 | Wilkinson et al. | |

OTHER PUBLICATIONS

GeeksforGeeks et al., "Detect a Cycle in a Directed Graph," May 5, 2021, GeeksforGeeks (Year: 2021).*
"Directed Acyclic Graph" (Year: 2025).*

* cited by examiner

*Primary Examiner* — Bryce P Bonzo
*Assistant Examiner* — Gabriella Kanani Shelton
(74) *Attorney, Agent, or Firm* — Kwan & Olynick LLP

(57)     ABSTRACT

Disclosed are some implementations of systems, apparatus, methods and computer program products for implementing a database backup system.

18 Claims, 10 Drawing Sheets

300

```
Example Declarative
Recovery Dependencies
//
{
    "service_name": "App",

// Service dependencies
    "recovery_dependencies": [
        "DB",
        "FileStore",
        "HBase"
    ]
}
```

```
"service_name": "DB",
// ...
 "Recovery Metadata Tuple":
[
  {
    "RPO": "5 mins",
    "RTO": "5 mins",
    "CTS": "$2M",
    "DR_Config": [
       "ActiveDR",
       "repl_log"
    ],
    "Failure_Mode": "Regional Failure"
  }, {
    "RPO": "15 mins",
    "RTO": "5 mins",
    "CTS": "$1M",
    "DR_Config": [
       "AutoScaleDR",
       "repl_batched"
    ],
    "Failure_Mode": "Regional Failure"
  }, {
    "RPO": "4 hours",
    "RTO": "12 hours",
    "CTS": "$20K",
  "DR_Config": [
      "PassiveDR",
      "repl_backup"
    ],
    "Failure_Mode": [
       "Regional Failure",
       "Data Corruption"
    ]
  }
]
}
```

Formula

500

1. $RTO = \max \left( \sum\limits_{start}^{complete} RTO_{path1}, \ \sum\limits_{start}^{complete} RTO_{path2}, \ ..., \ \sum\limits_{start}^{complete} RTO_{pathN} \right)$ 2. $RPO = \max \left( RPO_{node1}, \ RPO_{node2}, \ ..., \ RPO_{nodeN} \right)$ 3. $CTS = \sum\limits_{start}^{complete} CTS_{all \ nodes \ traveled};$ the CTS in the tuple selected

PARAMETER DRIVEN DYNAMIC DISASTER RECOVERY

COPYRIGHT NOTICE

TECHNICAL FIELD

This patent document generally relates to systems and techniques for distributed systems disaster recovery. More particularly, this patent document relates to parameter driven distributed systems disaster recovery.

BACKGROUND

"Cloud computing" services provide shared resources, applications, and information to computers and other devices upon request. In cloud computing environments, services can be provided by one or more servers accessible over the Internet rather than installing software locally on in-house computer systems. Users can interact with cloud computing services to undertake a wide range of tasks.

Data loss is a looming threat for organizations. Unfortunately, data loss can occur due to various causes including human error, natural calamities, and hackers. Having a backup of data is the optimal method to ensure that data is recoverable in case of loss or corruption.

BRIEF DESCRIPTION OF THE DRAWINGS

The included drawings are for illustrative purposes and serve only to provide examples of possible structures and operations for the disclosed systems, apparatus, methods and computer program products for facilitating database backup and recovery. These drawings in no way limit any changes in form and detail that may be made by one skilled in the art without departing from the spirit and scope of the disclosed implementations.

FIG. 3B shows example service disaster recovery metadata 350, in accordance with some implementations.

DETAILED DESCRIPTION

Examples of systems, apparatus, methods and computer program products according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

With the move to a region-based high availability model, some organizations are expressing concerns about regional disasters or possible regional level public cloud failures impacting their ability to use services in a cloud-based infrastructure.

In accordance with various implementations, parameter-driven service disaster recovery is disclosed. In some implementations, the parameters include recovery time objective (RTO), recovery point objective (RPO), and cost to serve (CTS). RTO is the time it takes to restore service disruption. RPO is the acceptable data loss measured in time. Cost to serve is the infrastructure cost for services. Generally, to reduce RTO or RPO, the CTS will be increased. Conversely, to reduce CTS, there will be an increase in RTO and RPO.

The parameters may be discrete values or continuous/linear. In addition, additional input or output parameters may include service disaster recovery (DR) configurations and/or failure mode that is being protected from by the configuration. For example, the failure mode may indicate that regional failures are protected against.

Figure 1:
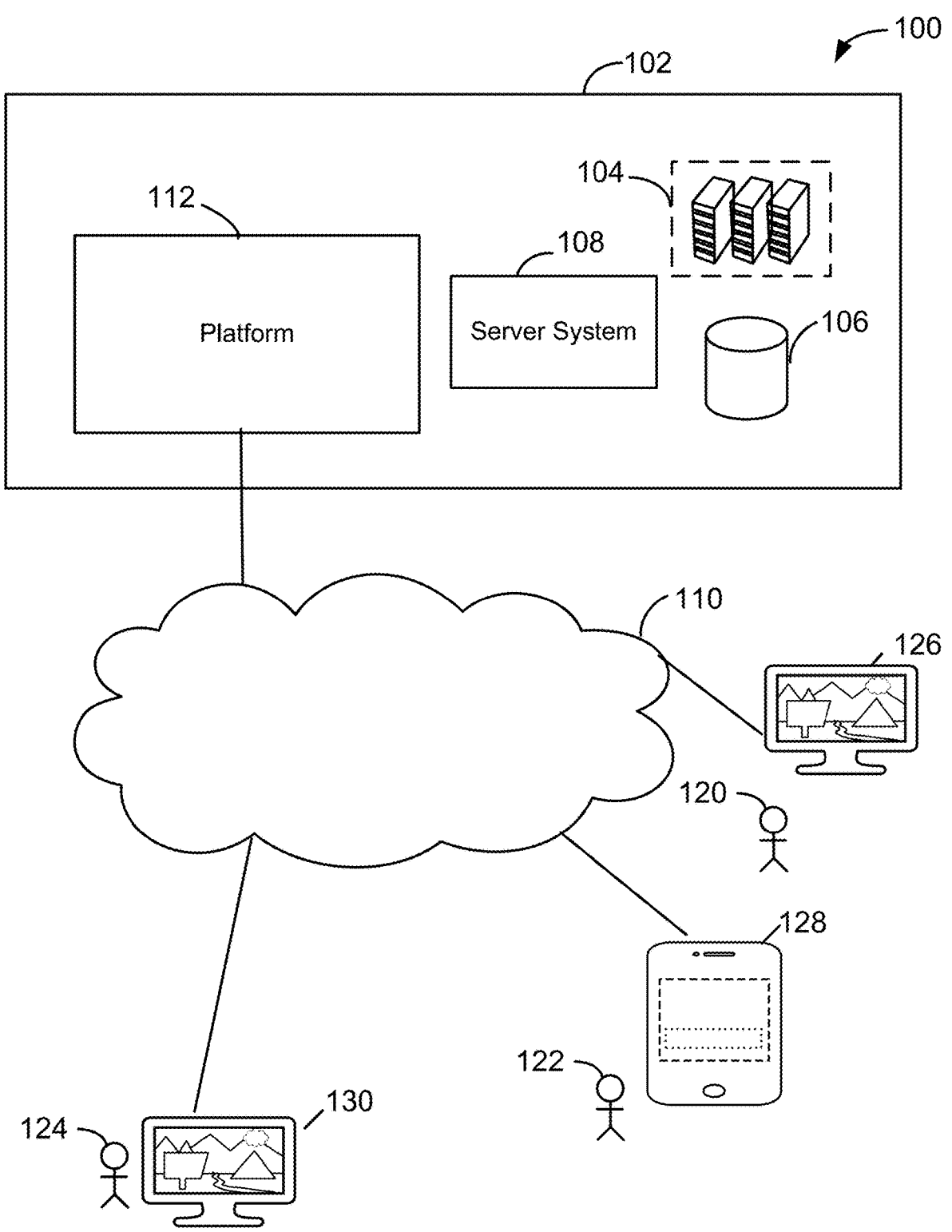
FIG. 1 shows a system diagram of an example of a system 100 configured to facilitate the backup of data, in accordance with some implementations.

FIG. 1 shows a system diagram of an example of a system 100 configured to facilitate the discovery of tenants, in accordance with some implementations. Database system 102 includes a variety of different hardware and/or software components that are in communication with each other. In the non-limiting example of FIG. 1, system 102 includes any number of computing devices such as servers 104. Servers 104 can include one or more web servers configurable to execute web applications. Servers 104 are in communication with one or more storage mediums 106 configured to store and maintain relevant data and/or metadata used to perform some of the techniques disclosed herein, as well as to store and maintain relevant data and/or metadata generated or transmitted by the techniques disclosed herein. Storage mediums 106 may further store computer-readable instructions configured to perform some of the techniques described herein. Storage mediums 106 can also store user accounts/user profiles of users of system 100, as well as database records such as customer relationship management (CRM) records.

System 102 includes server system 108, as described herein. More particularly, server system 108 supports the disaster recovery implementations, as described herein.

In some implementations, system 102 is configured to store user profiles/user accounts associated with users of system 102. Information maintained in a user profile of a user can include a client identifier such an Internet Protocol (IP) address or Media Access Control (MAC) address. In addition, the information can include a unique user identifier such as an alpha-numerical identifier, the user's name, a user email address, and credentials of the user. Credentials of the user can include a username and password. The information can further include job related information such as a job title, role, group, department, organization, and/or experience level, as well as any associated permissions. Profile information such as job related information and any associated permissions can be applied by system 102 to manage access to web applications or services.

Client devices 126, 128, 130 may be in communication with system 102 via network 110. More particularly, client devices 126, 128, 130 may communicate with server system 108 via network 110. For example, network 110 can be the Internet. In another example, network 110 comprises one or more local area networks (LAN) in communication with one or more wide area networks (WAN) such as the Internet.

Embodiments described herein are often implemented in a cloud computing environment, in which network 110, servers 104, and possible additional apparatus and systems such as multi-tenant databases may all be considered part of the "cloud." Servers 104 may be associated with a network domain, such as www.salesforce.com and may be controlled by a data provider associated with the network domain. In this example, employee users 120, 122, 124 of client computing devices 126, 128, 130 have accounts at Salesforce-.com®. By logging into their accounts, users 126, 128, 130 can access the various services and data provided by system 102 to employees. In other implementations, users 120, 122, 124 need not be employees of Salesforce.com® or log into accounts to access services and data provided by system 102. Examples of devices used by users include, but are not limited to, a desktop computer or portable electronic device such as a smartphone, a tablet, a laptop, a wearable device such as Google Glass®, another optical head-mounted display (OHMD) device, a smart watch, etc.

In some implementations, users 120, 122, 124 of client devices 126, 128, 130 can access services provided by system 102 via platform 112 or an application installed on client devices 126, 128, 130. More particularly, client devices 126, 128, 130 can log into system 102 via an application programming interface (API) or via a graphical user interface (GUI) using credentials of corresponding users 120, 122, 124 respectively. Client devices 126, 128, 130 can communicate with system 102 via platform 112. Communications between client devices 126, 128, 130 and system 102 can be initiated by a user 120, 122, 124. Alternatively, communications can be initiated by system 102 and/or application(s) installed on client devices 126, 128, 130. Therefore, communications between client devices 126, 128, 130 and system 102 can be initiated automatically or responsive to a user request.

Some implementations may also be practiced in distributed computing environments where tasks are performed by remote processing devices that are linked through a communications network. In a distributed computing environment, program modules may be located in local and/or remote computer storage media including memory storage devices.

Some implementations may be described in the general context of computing system executable instructions, such as program modules, being executed by a computer. The disclosed implementations may further include objects, data structures, and/or metadata, which may facilitate the implementation of disaster recovery, as described herein.

Figure 2:
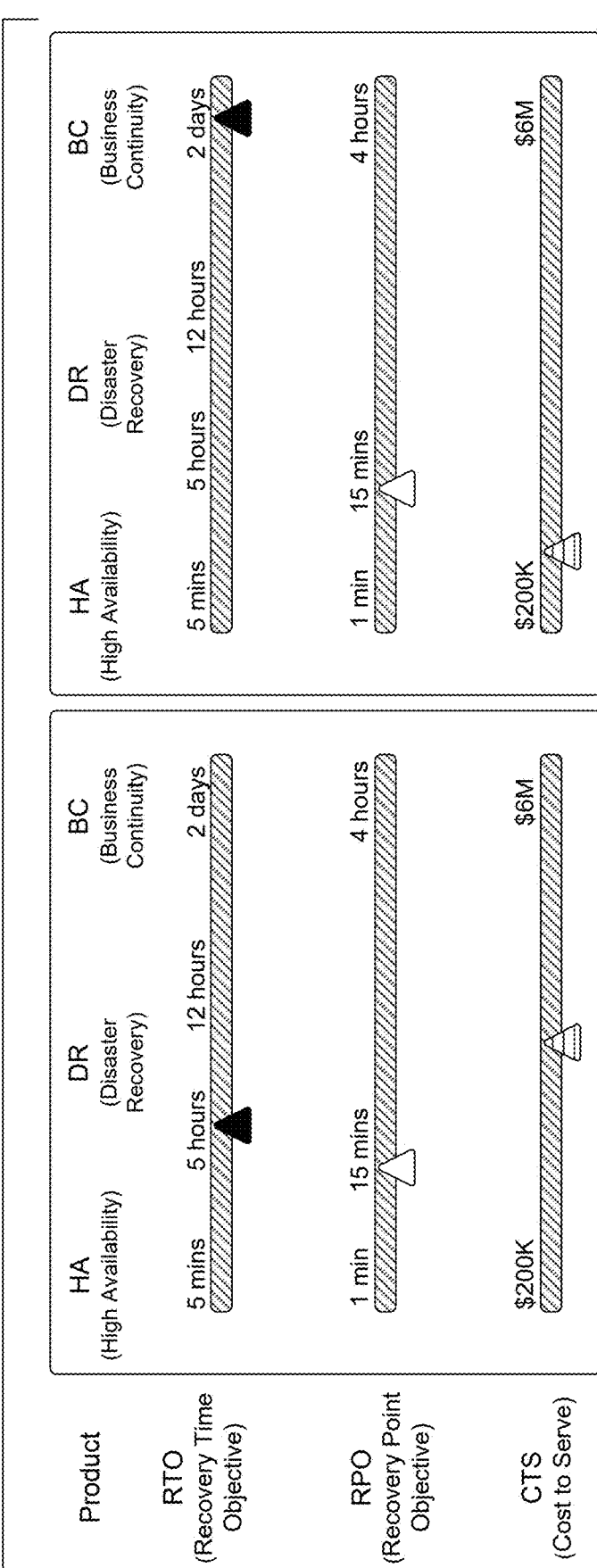
FIG. 2 shows an example graphical user interface (GUI) 200 enabling parameter driven disaster recovery.

FIG. 2 shows an example graphical user interface (GUI) 200 enabling parameter driven disaster recovery. As shown in this example, it is possible for a user to modify RTO, RPO, and/or CTS settings. In FIG. 2, the user has increased RTO from 5 hours to 2 days. In response, the CTS setting has decreased. More particularly, by increasing the RTO (e.g., the time it takes to restore data), the cost of the infrastructure for providing this restoration decreases.

Figure 3A:
FIG. 3A shows example service disaster recovery dependencies 300, in accordance with some implementations.

FIG. 3A shows example declarative service disaster recovery dependencies 300, in accordance with some implementations. As shown in this example, the service "App" is dependent on DB, FileStore, and HBase services. Dependencies may be configured for one or more services in a similar manner.

FIG. 3B shows example service disaster recovery metadata 350, in accordance with some implementations. In this example, a service, "DB," has multiple recovery configuration tuples that are available.

The first tuple includes RPO 5 minutes, RTO 5 minutes, and CTS 2 million. The disaster recovery configuration can further include Active disaster recovery (DR) and/or log-based replication. In active DR, the services in the DR region actively serve customers' workload in that region (before the DR event occurs). The failure mode protects against regional failures.

The second tuple includes RPO 15 minutes, RTO 5 minutes, and CTS 1 million. The disaster recovery configuration can further include Auto scale DR and/or batched replication. The failure mode protects against regional failures.

Figure 4:
FIG. 4 shows a diagram illustrating an acyclic dependency graph 400, in accordance with some implementations.
Figure 4:
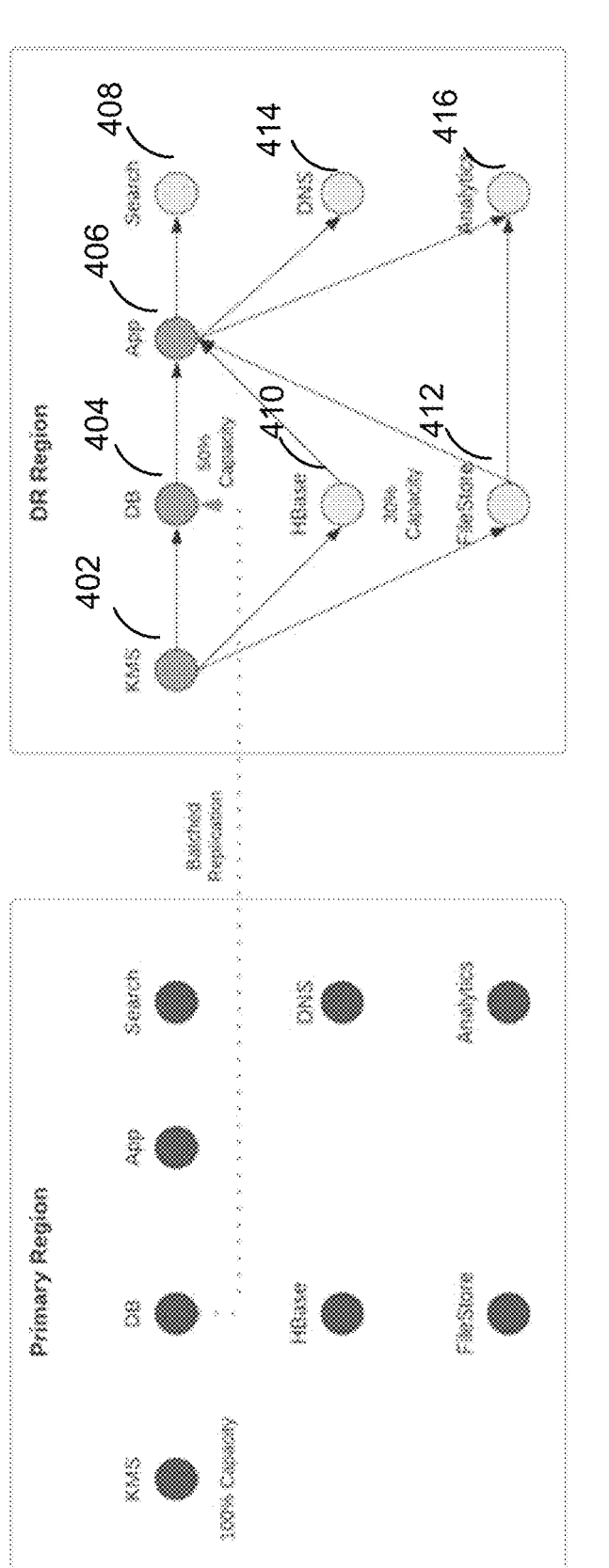

An acyclic dependency graph is automatically generated based, at least in part, on the service disaster recovery dependencies. FIG. 4 shows diagram 400 illustrating an acyclic dependency graph, in accordance with some implementations. Each service is represented by a corresponding node. As shown in this example, the service App 406 is dependent on services DB 404, FileStore 412, and HBase services 410, as described above with reference to FIG. 3A. In this example, service DB 404 is dependent on service KMS 402. Search service 408, DNS service 414, and Analytics service 416 are dependent on App service 406.

In accordance with various implementations, paths of the dependency graph are automatically traversed to determine optimal configurations that meet the input parameters. More particularly, the paths are traversed to obtain one or more parameters derived based upon a set of one or more rules (e.g., equations). For example, the paths of FIG. 4 may include 10 different paths KMS-DB-App-Search, KMS-DB-App-DNS, KMS-DB-App-Analytics, KMS-HBase-App-DNS, KMS-HBase-App-Search, KMS-HBase-App-Analytics, KMS-FileStore-App-Analytics, KMS-FileStore-App-DNS, KMS-FileStore-App-Search, KMS-FileStore-Analytics. Example equations are described below with reference to FIG. 5A.

Figure 5A:
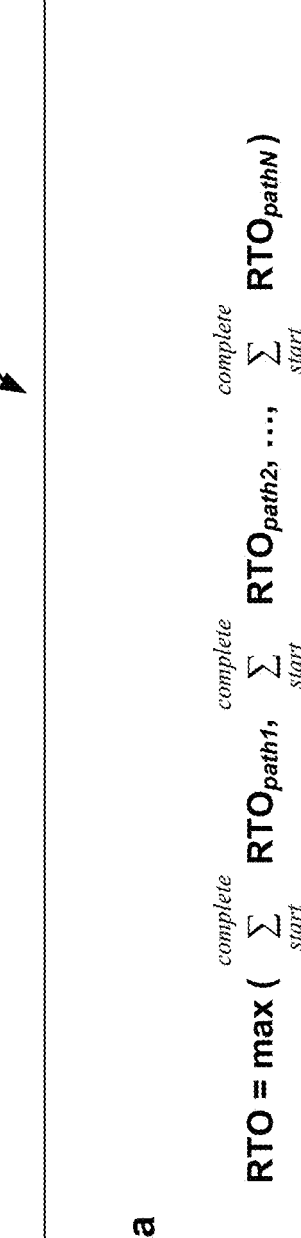
FIG. 5A shows an example of equations 500 that can be applied to the acyclic dependency graph, in accordance with some implementations.

FIG. 5A shows an example of equations 500 that can be applied to the acyclic dependency graph, in accordance with some implementations. In equation 1, the maximum RTO value of all RTO path values is determined. More particularly, for a given path, the total RTO value is obtained by summing RTO values for nodes in the path. In equation 2, the maximum RPO value of all nodes is obtained. In equation 3, the CTS is the total sum of the CTS of all nodes traveled.

Figure 5B:
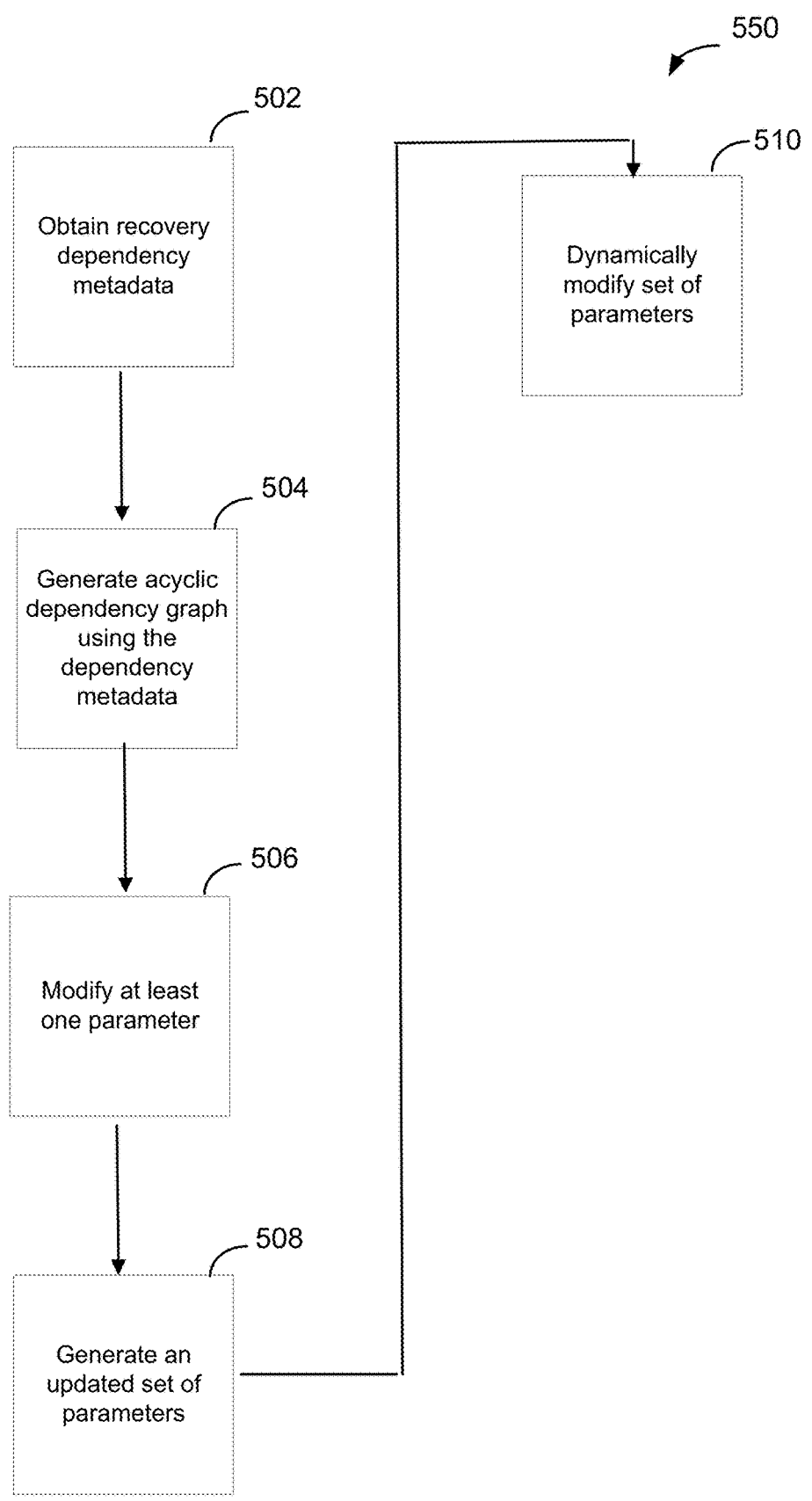
FIG. 5B shows an example of a process flow diagram 550 representing a method of guiding database backup, in accordance with some implementations.

FIG. 5B shows an example of a process flow diagram 550 representing a method of guiding distributed services disaster recovery, in accordance with some implementations. The system obtains, for each node of a set of nodes, recovery dependency metadata at 502, each node of the set of nodes representing a corresponding service. As described above, the recovery dependency metadata indicates services on which the service depends. The system automatically generates an acyclic dependency graph corresponding to the set of nodes at 504 using the recovery dependency metadata, as described above. The system modifies at least one parameter of a set of parameters at 506 responsive to a user's input indication in relation to at least one corresponding parameter. For example, the set of parameters can include recovery time objective (RTO), recovery point objective (RPO), and cost to serve (CTS). CTS can be a constant or a function.

Service recovery metadata includes a plurality of tuples representing configuration settings. Each node of the dependency graph may have corresponding service recovery metadata tuple(s). In the following description, tuples are declarative. Alternatively, tuples may be computed dynamically.

A tuple can include an amount of RPO, an amount of RTO, and an amount CTS. In addition, a tuple can include, and not limited to, a disaster recovery configuration and/or failure mode protection. Disaster recovery configuration can include, for example, active DR (with customer traffic), passive DR (no customer traffic), static scalability (For example, 100% or 50% of capacity allocated at DR), autoscaling, and/or composite configuration (active DR and autoscaling). In passive DR, the services in the DR region are not serving the customers' workload; the services are activated only after a DR event happens. Failure mode protection can include protection against regional failure, protection against data corruptions, etc.

In this example, for node KMS, the tuples include (RPO 5 minutes, RTO of 5 minutes, CTS of $500K, Configuration of Active DR, and failure mode protecting against Regional Failure) and (RPO 5 minutes, RTO of 1 hour, CTS of $100K, Configuration of Passive DR, and failure mode protecting against Regional Failure).

For node DB, the tuples include (RPO 5 minutes, RTO of 5 minutes, CTS of $2 million, configuration of ActiveDR-replication log, failure mode protecting against Regional Failure), (RPO of 15 minutes, RTO of 5 minutes, CTS of $1 million, configuration of Autoscale DR, replication batched, and failure mode protecting against Regional Failure), (RPO of 15 minutes, RTO of 4 hours, CTS of $200K, configuration of Passive DR, and failure mode protecting against Regional Failure), and (RPO of 4 hours, RTO of 12 hours, CTS of $20K, Passive DR, and failure mode protecting against Regional Failure and Data Corruption).

In autoscale DR, the services in the DR region actively serve customers' workload in the region and can increase provisioned capacity automatically when the workload increases (and vice versa). For example, the application service in the DR region may be actively serving customers' workloads with 10 VMs. When it detects workload increases, it automatically provisions two more VMs in batches.

For the search node, the tuples include (RPO of 0 minutes, RTO of 5 minutes, CTS of $200 k, configuration of ActiveDR, and mode protecting against Regional Failure), and (RPO of 0 minutes, RTO of 5 hours, CTS of $10K, configuration of PassiveDR, and failure mode protecting against Regional Failure).

For the HBase node, the tuples include (RPO of 15 minutes, RTO of 15 minutes, CTS of $30K, configuration of ActiveDR, and failure mode protecting against Regional Failure) and (RPO of 4 hours, RTO of 12 hours, CTS of $15K, protection mode of PassiveDR, and failure mode protecting against Regional Failure).

For simplification of the examples, tuples are not provided for all nodes. For purposes of the examples, it is assumed that the tuples include a default value of zeros.

An estimation framework of the system generates an updated set of parameters based, at least in part, on the modified at least one parameter using the acyclic dependency graph at 508. This is accomplished, at least in part, by traversing the acyclic dependency graph. A variety of algorithms may be applied to traverse the graph. For example, breadth first search, depth first search, or minimum spanning tree may be applied. Eventually, a tuple is selected for each service for the desired product level (RPO, RTO, or CTS).

For example, assuming that the input RTO is a maximum of 30 minutes, the system calculates the RTO for the respective paths by adding, for each path within the database system, the RTO for the nodes within the path to obtain a path RTO. If the total path RTO is greater than the input RTO of 30 minutes, the path and associated tuple(s) is disregarded. However, if the total path RTO is less than or equal to the input RTO of 30 minutes, the tuples for the maximum path RTO that is less than the input RTO are saved. For example, path 1 traversed from KMS (5 minutes) to DB (5 minutes) to Search (5 minutes) results in a RTO of 15 minutes; path 2 traversed from KMS (5 minutes) to HBase (15 minutes) to Search (5 minutes) results in a RTO of 25 minutes. The CTS of each of the nodes, from the pertinent saved tuples, is added to determine the total CTS. For example, the CTS=KMS (500K)+DB ($2 million)+Search ($200K)+HBase (30K)=$2.73 million. The RPO is the maximum RPO of all nodes using the saved tuples. For example, the RPO is the maximum of (5 minutes, 5 minutes, 10 minutes)=10 minutes. A configuration and failure mode may also be determined from the pertinent tuples. For example, the configuration may be ActiveDR, and then repl_log.

For example, because 5 hours and 12 hours are greater than 30 minutes, the tuples (RPO of 0 minutes, RTO of 5 hours, CTS of $10K, configuration of PassiveDR, and failure mode protecting against Regional Failure) and (RPO of 4 hours, RTO of 12 hours, CTS of $15K, protection mode of PassiveDR, and failure mode protecting against Regional Failure) and associated paths are disregarded.

As another example, assuming the input RPO is a maximum of 15 minutes, the node tuples having an RPO of greater than 15 minutes are disregarded. The path RTO is determined for the respective paths by adding, for each path within the database system, the RTO for the nodes within the path to obtain a path RTO (while disregarding tuples that have been eliminated based upon the input RPO). The maximum RPO is determined by selecting the maximum RPO from all tuples that have not been eliminated. The CTS of each of the nodes, from the pertinent saved tuples, is added to determine the total CTS. A configuration and failure mode may also be determined from the pertinent tuples.

As yet another example, assuming that the input CTS is at most $2 million, the CTS of all nodes are summed. The CTS of each of the nodes is added to determine a total CTS. More particularly, the CTS of tuples that achieve a maximum of $2 million are added. The pertinent tuples may be saved for further calculations. The system calculates the RTO for the respective paths by adding, for each path within the database system, the RTO for the nodes within the path to obtain a corresponding path RTO. The maximum RPO is determined by selecting the maximum RPO from all tuples that have not been eliminated. A configuration and failure mode may also be determined from the pertinent tuples.

As yet another example, the input parameters include RPO of 1 minute and RTO of 5 minutes. The input parameters are transmitted to the parameter estimation framework to compute and choose the data recovery configuration that can meet the desired RPO/RTO and the associated CTS. The CTS for this configuration is $6 million. The DR inflation level is 100% for lower RTO (the time to restore service). Database replication is performed in streaming mode (for low latency/low RPO).

As yet another example, the RTO is changed from 5 minutes to 5 hours and the RPO is changed from one minute to 15 minutes. The adjusted input parameters are sent to the estimation framework to compute the data recovery configuration that can meet the desired RPO/RTO and the associated CTS. As a result, the CTS changes from $6 million to $2 million. The DR inflation level changes from 100% to 30-50%. In addition, the data replication changes from streaming mode to batched replication. In batched replication, data generated in primary region 1 is batched and periodically replicated to DR region 2. For example, data generated in Region 1 may be accumulated as a batch and is replicated to Region 2 every 15 minutes.

As yet another example, the RTO is changed from 5 hours to 2 days and the RPO is changed from 15 minutes to 4 hours. The adjusted input parameters are sent to the estimation system to compute and select the data recovery configuration that can meet the RTO/RPO and the associated CTS. In response, the CTS changes from $2 million to $200K. The DR inflation level changes from 30%-50% to 0-10%. DB replication changes from batched replication to periodical (e.g., hourly) backup replication.

The system then dynamically modifies the set of parameters of the services in the distributed system according to the updated set of parameters at 510. More particularly, an application programming interface (API) of each service can be called to provide the corresponding tuple or portion thereof.

As one example, if the RPO is decreased, this increases CTS. The replication method for the DB service may change from batched replication to streaming replication. This reduces the RPO with a higher compute and infrastructure cost. As yet another example, the RTO is increased, which results in a decrease of CTS. The DR inflation level (e.g., pre-deployed disaster recovery capacity) may decrease with a lower cost to allow higher RTO. As yet another example, the CTS is decreased, resulting in an increase of RTO. The disaster recovery inflation level may be decreased (e.g., from 10 VMs to 5 VMs) to reduce the CTS. The recovery time RTO may increase as more capacity will need to be provisioned when disaster recovery is activated.

Some but not all of the techniques described or referenced herein are implemented using or in conjunction with a database system. Salesforce.com, inc. is a provider of customer relationship management (CRM) services and other database management services, which can be accessed and used in conjunction with the techniques disclosed herein in some implementations. In some but not all implementations, services can be provided in a cloud computing environment, for example, in the context of a multi-tenant database system. Thus, some of the disclosed techniques can be implemented without having to install software locally, that is, on computing devices of users interacting with services available through the cloud. Some of the disclosed techniques can be implemented via an application installed on computing devices of users.

Information stored in a database record can include various types of data including character-based data, audio data, image data, animated images, and/or video data. A database record can store one or more files, which can include text, presentations, documents, multimedia files, and the like. Data retrieved from a database can be presented via a computing device. For example, visual data can be displayed in a graphical user interface (GUI) on a display device such as the display of the computing device. In some but not all implementations, the disclosed methods, apparatus, systems, and computer program products may be configured or designed for use in a multi-tenant database environment.

The term "multi-tenant database system" generally refers to those systems in which various elements of hardware and/or software of a database system may be shared by one or more customers. For example, a given application server may simultaneously process requests for a great number of customers, and a given database table may store rows of data such as feed items for a potentially much greater number of customers.

An example of a "user profile" or "user's profile" is a database object or set of objects configured to store and maintain data about a given user of a social networking system and/or database system. The data can include general information, such as name, title, phone number, a photo, a biographical summary, and a status, e.g., text describing what the user is currently doing. Where there are multiple tenants, a user is typically associated with a particular tenant. For example, a user could be a salesperson of a company, which is a tenant of the database system that provides a database service.

The term "record" generally refers to a data entity having fields with values and stored in database system. An example of a record is an instance of a data object created by a user of the database service, for example, in the form of a CRM record about a particular (actual or potential) business relationship or project. The record can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

Some non-limiting examples of systems, apparatus, and methods are described below for implementing database systems and enterprise level social networking systems in conjunction with the disclosed techniques. Such implementations can provide more efficient use of a database system. For instance, a user of a database system may not easily know when important information in the database has changed, e.g., about a project or client. Such implementations can provide feed tracked updates about such changes and other events, thereby keeping users informed.

Figure 6A:
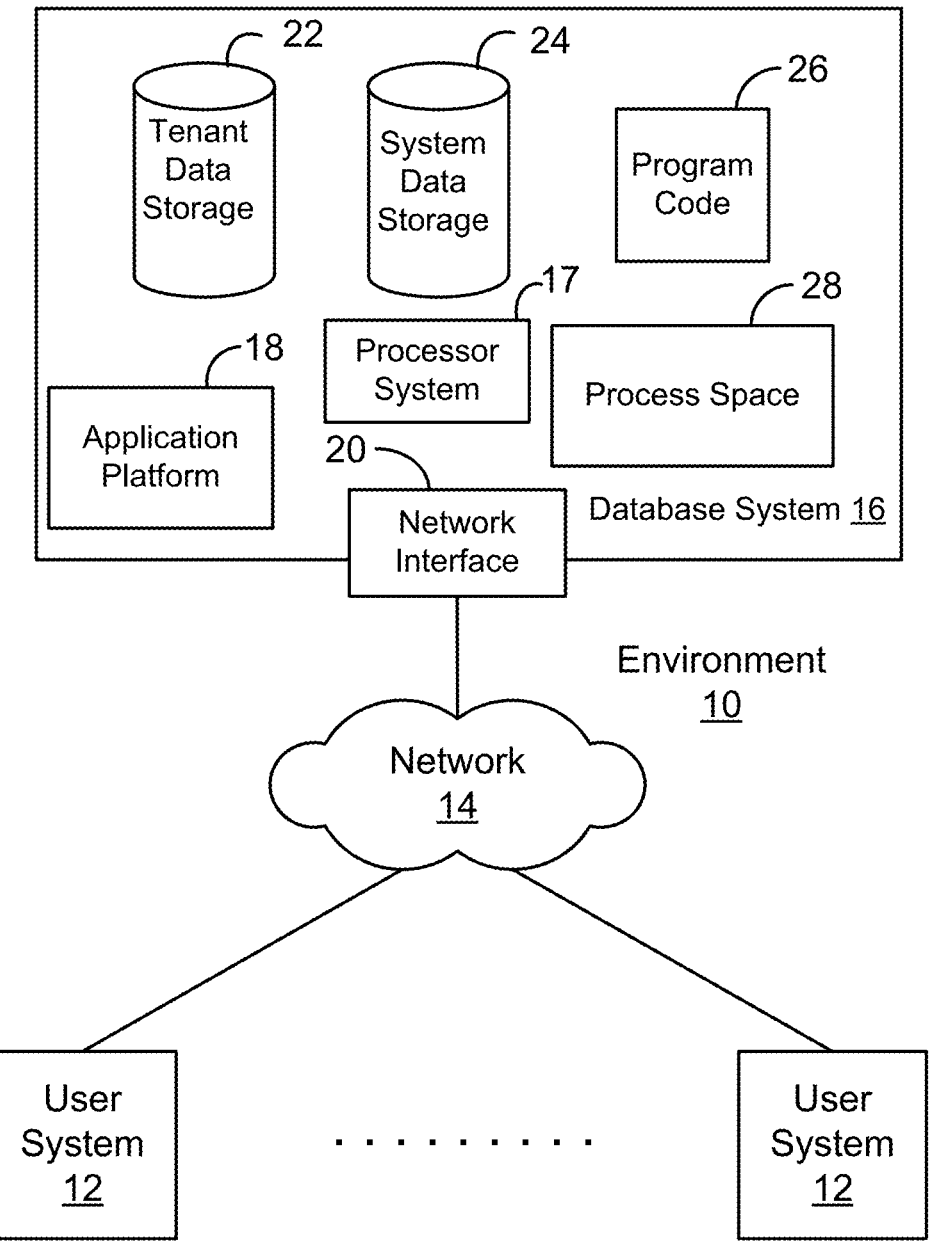
FIG. 6A shows a block diagram of an example of an environment 10 in which an on-demand database service can be used in accordance with some implementations.

FIG. 6A shows a block diagram of an example of an environment 10 in which an on-demand database service exists and can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a work station and/or a network of computing devices. As illustrated in FIG. 6A (and in more detail in FIG. 6B) user systems 12 might interact via a network 14 with an on-demand database service, which is implemented in the example of FIG. 6A as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 6A, implements a web-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figures 7A, 7B:
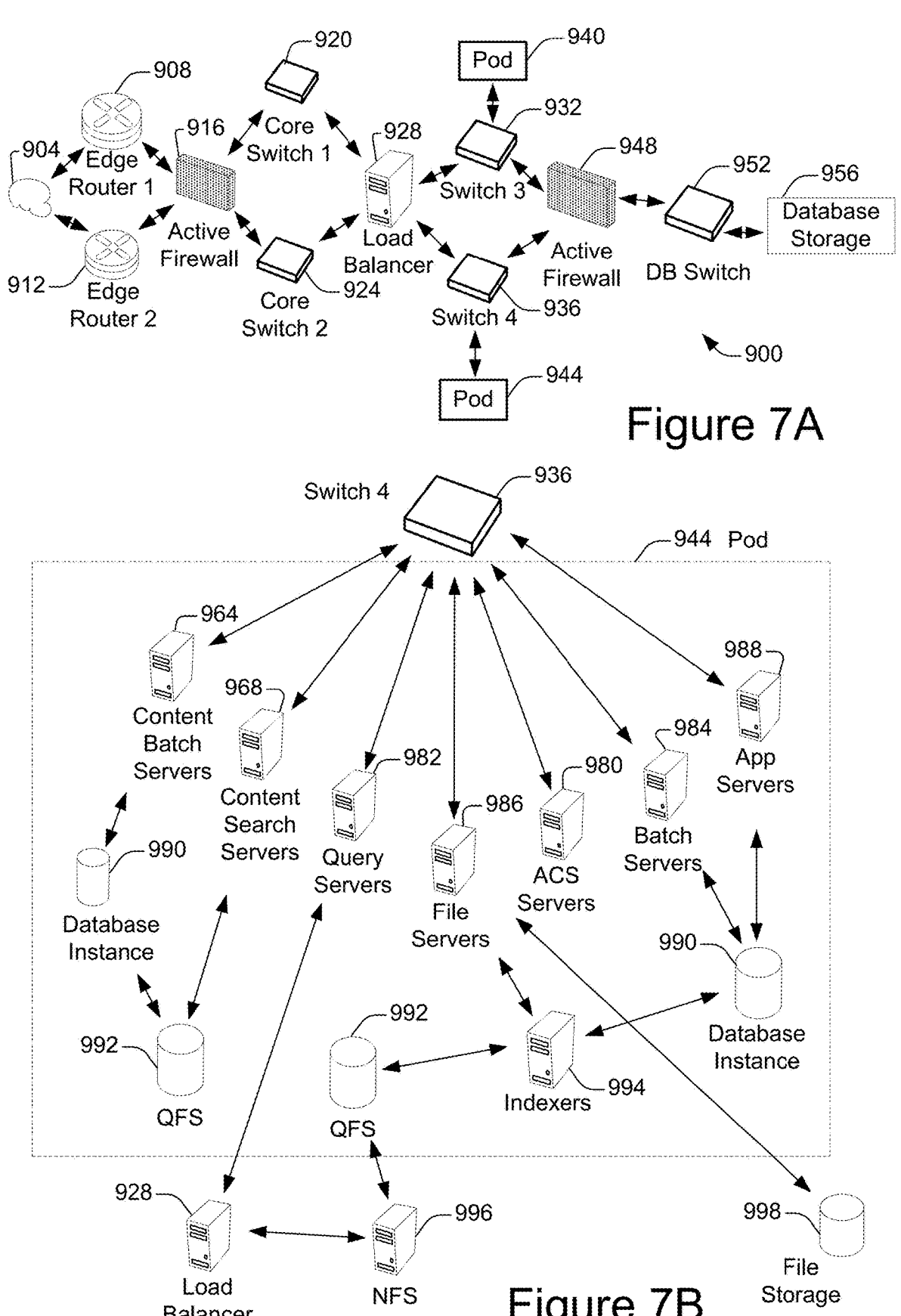
FIG. 7A shows a system diagram of an example of architectural components of an on-demand database service environment 900, in accordance with some implementations.
FIG. 7B shows a system diagram further illustrating an example of architectural components of an on-demand database service environment, in accordance with some implementations.

One arrangement for elements of system 16 is shown in FIGS. 7A and 7B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 6A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such Google Glass® or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

Figure 6B:
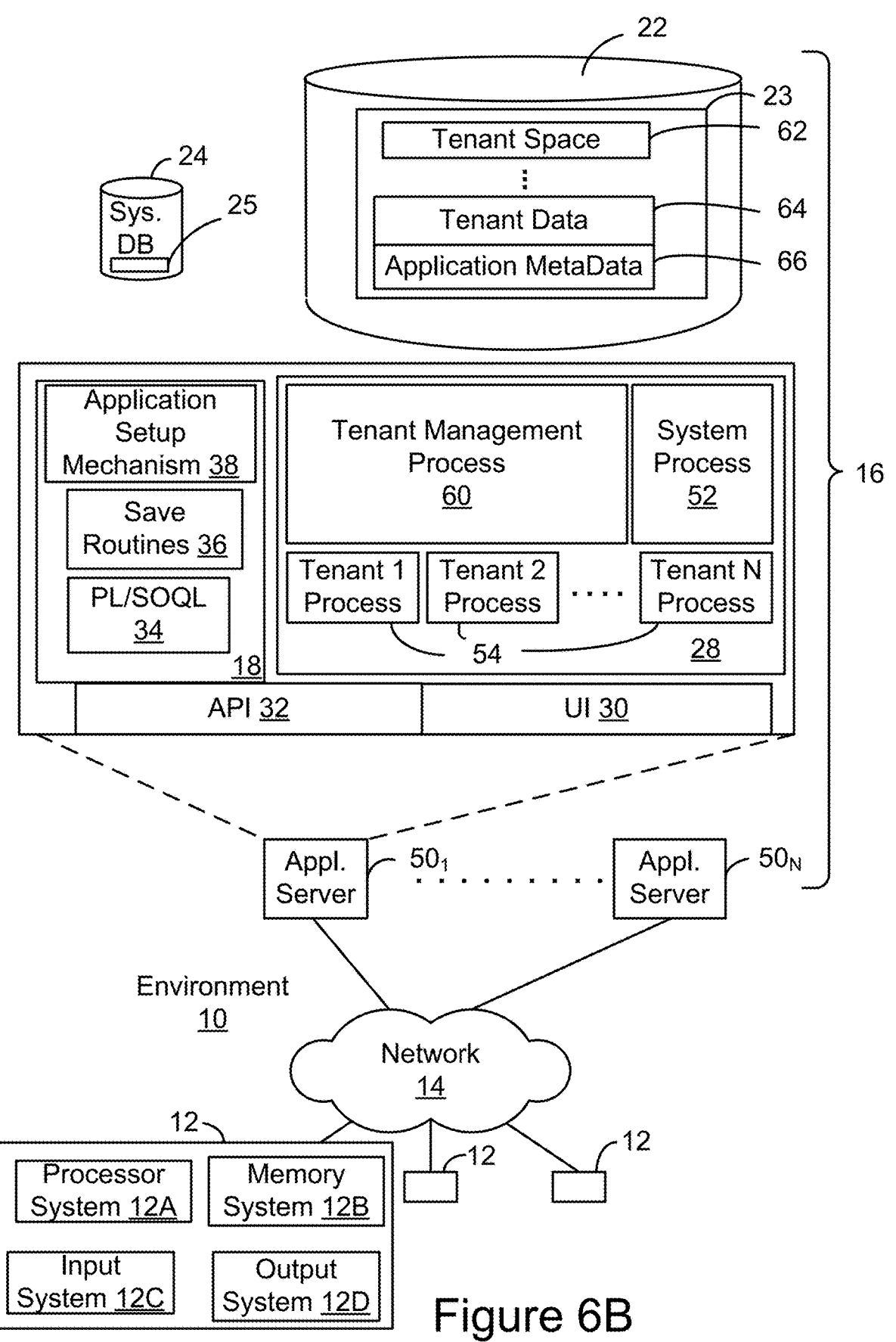
FIG. 6B shows a block diagram of an example of some implementations of elements of FIG. 6A and various possible interconnections between these elements.

FIG. 6B shows a block diagram of an example of some implementations of elements of FIG. 6A and various possible interconnections between these elements. That is, FIG. 6B also illustrates environment 10. However, in FIG. 6B elements of system 16 and various interconnections in some implementations are further illustrated. FIG. 6B shows that user system 12 may include processor system 12A, memory system 12B, input system 12C, and output system 12D. FIG. 6B shows network 14 and system 16. FIG. 6B also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers 50₁-50_N_, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 6A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 6B, system 16 may include a network interface 20 (of FIG. 6A) implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server 50₁ might be coupled via the network 14 (e.g., the Internet), another application server 50_N-1_ might be coupled via a direct network link, and another application server 50_N_ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

FIG. 7A shows a system diagram of an example of architectural components of an on-demand database service environment 900, in accordance with some implementations. A client machine located in the cloud 904, generally referring to one or more networks in combination, as described herein, may communicate with the on-demand database service environment via one or more edge routers 908 and 912. A client machine can be any of the examples of user systems 12 described above. The edge routers may communicate with one or more core switches 920 and 924 via firewall 916. The core switches may communicate with a load balancer 928, which may distribute server load over different pods, such as the pods 940 and 944. The pods 940 and 944, which may each include one or more servers and/or other computing resources, may perform data processing and other operations used to provide on-demand services. Communication with the pods may be conducted via pod switches 932 and 936. Components of the on-demand database service environment may communicate with a database storage 956 via a database firewall 948 and a database switch 952.

As shown in FIGS. 7A and 7B, accessing an on-demand database service environment may involve communications transmitted among a variety of different hardware and/or software components. Further, the on-demand database service environment 900 is a simplified representation of an actual on-demand database service environment. For example, while only one or two devices of each type are shown in FIGS. 7A and 7B, some implementations of an on-demand database service environment may include anywhere from one to many devices of each type. Also, the on-demand database service environment need not include each device shown in FIGS. 7A and 7B, or may include additional devices not shown in FIGS. 7A and 7B.

Moreover, one or more of the devices in the on-demand database service environment 900 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 904 is intended to refer to a data network or combination of data networks, often including the Internet. Client machines located in the cloud 904 may communicate with the on-demand database service environment to access services provided by the on-demand database service environment. For example, client machines may access the on-demand database service environment to retrieve, store, edit, and/or process information.

In some implementations, the edge routers 908 and 912 route packets between the cloud 904 and other components of the on-demand database service environment 900. The edge routers 908 and 912 may employ the Border Gateway Protocol (BGP). The BGP is the core routing protocol of the Internet. The edge routers 908 and 912 may maintain a table of IP networks or 'prefixes', which designate network reachability among autonomous systems on the Internet.

In one or more implementations, the firewall 916 may protect the inner components of the on-demand database service environment 900 from Internet traffic. The firewall 916 may block, permit, or deny access to the inner components of the on-demand database service environment 900 based upon a set of rules and other criteria. The firewall 916 may act as one or more of a packet filter, an application gateway, a stateful filter, a proxy server, or any other type of firewall.

In some implementations, the core switches 920 and 924 are high-capacity switches that transfer packets within the on-demand database service environment 900. The core switches 920 and 924 may be configured as network bridges that quickly route data between different components within the on-demand database service environment. In some implementations, the use of two or more core switches 920 and 924 may provide redundancy and/or reduced latency.

In some implementations, the pods 940 and 944 may perform the core data processing and service functions provided by the on-demand database service environment. Each pod may include various types of hardware and/or software computing resources. An example of the pod architecture is discussed in greater detail with reference to FIG. 7B.

In some implementations, communication between the pods 940 and 944 may be conducted via the pod switches 932 and 936. The pod switches 932 and 936 may facilitate communication between the pods 940 and 944 and client machines located in the cloud 904, for example via core switches 920 and 924. Also, the pod switches 932 and 936 may facilitate communication between the pods 940 and 944 and the database storage 956.

In some implementations, the load balancer 928 may distribute workload between the pods 940 and 944. Balancing the on-demand service requests between the pods may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948. The database firewall 948 may act as a computer application firewall operating at the database application layer of a protocol stack. The database firewall 948 may protect the database storage 956 from application attacks such as structure query language (SQL) injection, database rootkits, and unauthorized information disclosure.

In some implementations, the database firewall 948 may include a host using one or more forms of reverse proxy services to proxy traffic before passing it to a gateway router. The database firewall 948 may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, communication with the database storage 956 may be conducted via the database switch 952. The multi-tenant database storage 956 may include more than one hardware and/or software components for handling database queries. Accordingly, the database switch 952 may direct database queries transmitted by other components of the on-demand database service environment (e.g., the pods 940 and 944) to the correct components within the database storage 956.

In some implementations, the database storage 956 is an on-demand database system shared by many different organizations. The on-demand database service may employ a multi-tenant approach, a virtualized approach, or any other type of database approach. On-demand database services are discussed in greater detail with reference to FIGS. 7A and 7B.

FIG. 7B shows a system diagram further illustrating an example of architectural components of an on-demand database service environment, in accordance with some implementations. The pod 944 may be used to render services to a user of the on-demand database service environment 900. In some implementations, each pod may include a variety of servers and/or other systems. The pod 944 includes one or more content batch servers 964, content search servers 968, query servers 982, file servers 986, access control system (ACS) servers 980, batch servers 984, and app servers 988. Also, the pod 944 includes database instances 990, quick file systems (QFS) 992, and indexers 994. In one or more implementations, some or all communication between the servers in the pod 944 may be transmitted via the switch 936.

The content batch servers 964 may handle requests internal to the pod. These requests may be long-running and/or not tied to a particular customer. For example, the content batch servers 964 may handle requests related to log mining, cleanup work, and maintenance tasks.

The content search servers 968 may provide query and indexer functions. For example, the functions provided by the content search servers 968 may allow users to search through content stored in the on-demand database service environment.

The file servers 986 may manage requests for information stored in the file storage 998. The file storage 998 may store information such as documents, images, and basic large objects (BLOBs). By managing requests for information using the file servers 986, the image footprint on the database may be reduced.

The query servers 982 may be used to retrieve information from one or more file systems. For example, the query system 982 may receive requests for information from the app servers 988 and then transmit information queries to the NFS 996 located outside the pod.

The pod 944 may share a database instance 990 configured as a multi-tenant environment in which different organizations share access to the same database. Additionally, services rendered by the pod 944 may call upon various hardware and/or software resources. In some implementations, the ACS servers 980 may control access to data, hardware resources, or software resources.

In some implementations, the batch servers 984 may process batch jobs, which are used to run tasks at specified times. Thus, the batch servers 984 may transmit instructions to other servers, such as the app servers 988, to trigger the batch jobs.

In some implementations, the QFS 992 may be an open source file system available from Sun Microsystems® of Santa Clara, California. The QFS may serve as a rapid-access file system for storing and accessing information available within the pod 944. The QFS 992 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 968 and/or indexers 994 to identify, retrieve, move, and/or update data stored in the network file systems 996 and/or other storage systems.

In some implementations, one or more query servers 982 may communicate with the NFS 996 to retrieve and/or update information stored outside of the pod 944. The NFS 996 may allow servers located in the pod 944 to access information to access files over a network in a manner similar to how local storage is accessed.

In some implementations, queries from the query servers 922 may be transmitted to the NFS 996 via the load balancer 928, which may distribute resource requests over various resources available in the on-demand database service environment. The NFS 996 may also communicate with the QFS 992 to update the information stored on the NFS 996 and/or to provide information to the QFS 992 for use by servers located within the pod 944.

In some implementations, the pod may include one or more database instances 990. The database instance 990 may transmit information to the QFS 992. When information is transmitted to the QFS, it may be available for use by servers within the pod 944 without using an additional database call.

In some implementations, database information may be transmitted to the indexer 994. Indexer 994 may provide an index of information available in the database 990 and/or QFS 992. The index information may be provided to file servers 986 and/or the QFS 992.

In some implementations, one or more application servers or other servers described above with reference to FIGS. 7A and 7B include a hardware and/or software framework configurable to execute procedures using programs, routines, scripts, etc. Thus, in some implementations, one or more of application servers $50_1$-$50_N$ of FIG. 7B can be configured to initiate performance of one or more of the operations described above by instructing another computing device to perform an operation. In some implementations, one or more application servers $50_1$-$50_N$ carry out, either partially or entirely, one or more of the disclosed operations. In some implementations, app servers 988 of FIG. 7B support the construction of applications provided by the on-demand database service environment 900 via the pod 944. Thus, an app server 988 may include a hardware and/or software framework configurable to execute procedures to partially or entirely carry out or instruct another computing device to carry out one or more operations disclosed herein. In alternative implementations, two or more app servers 988 may cooperate to perform or cause performance of such operations. Any of the databases and other storage facilities described above with reference to FIGS. 6A, 6B, 7A and 7B can be configured to store lists, articles, documents, records, files, and other objects for implementing the operations described above. For instance, lists of available communication channels associated with share actions for sharing a type of data item can be maintained in tenant data storage 22 and/or system data storage 24 of FIGS. 7A and 7B. By the same token, lists of default or designated channels for particular share actions can be maintained in storage 22 and/or storage 24. In some other implementations, rather than storing one or more lists, articles, documents, records, and/or files, the databases and other storage facilities described above can store pointers to the lists, articles, documents, records, and/or files, which may instead be stored in other repositories external to the systems and environments described above with reference to FIGS. 6A, 6B, 7A and 7B.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of the implementations claimed.

It should be understood that some of the disclosed implementations can be embodied in the form of control logic using hardware and/or computer software in a modular or integrated manner. Other ways and/or methods are possible using hardware and a combination of hardware and software.

Any of the disclosed implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to: magnetic media such as hard disks, floppy disks, and magnetic tape; optical media such as flash memory, compact disk (CD) or digital versatile disk (DVD); magneto-optical media; and hardware devices specially configured to store program instructions, such as read-only memory (ROM) devices and random access memory (RAM) devices. A computer-readable medium may be any combination of such storage devices.

Any of the operations and techniques described in this application may be implemented as software code to be executed by a processor using any suitable computer language such as, for example, Java, C++ or Perl using, for example, object-oriented techniques. The software code may be stored as a series of instructions or commands on a computer-readable medium. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system or computing device may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A method, comprising:

obtaining, by one or more servers of a multi-tenant database system, for each node of a set of nodes, recovery dependency metadata, each node of the set of nodes representing a corresponding service of services being provided in a cloud computing environment, the recovery dependency metadata indicating one or more services on which the service depends;

generating, by the one or more servers of the multi-tenant database system, an acyclic dependency graph corresponding to the set of nodes using the recovery dependency metadata;

validating, by the one or more servers of the multi-tenant database system using the acyclic dependency graph, that no cyclic dependency exists for the services corresponding to the set of nodes;

modifying, by the one or more servers of the multi-tenant database system, at least one parameter of a set of parameters of a distributed system responsive to an input indication, the set of parameters including a recovery time objective (RTO), a recovery point objective (RPO), and a cost to serve (CTS);

generating, by the one or more servers of the multi-tenant database system, an updated set of parameters of the distributed system based, at least in part, on the modified at least one parameter using the acyclic dependency graph, wherein generating the updated set of parameters includes determining an RPO value for each node of the set of nodes by applying the acyclic dependency graph and setting an updated RPO of the updated set of parameters to a maximum RPO value selected from the determined RPO values;

dynamically, by the one or more servers of the multi-tenant database system, modifying a disaster recovery configuration of the services in the distributed system according to the updated set of parameters such that no cyclic dependency exists for the services corresponding to the set of nodes, wherein the disaster recovery configuration protects against a failure mode during disaster recovery of the services; and calling, by the one or more servers of the multi-tenant database system, an application programming interface of at least one of the one or more services to provide the disaster recovery configuration for implementation.

2. The method of claim 1, wherein generating the updated set of parameters of the distributed system comprises:

determining, for each of a plurality of paths of the acyclic dependency graph among the services of the distributed system, a corresponding RTO path value; and selecting the maximum RTO value from the determined RTO path values.

3. The method of claim 1, wherein generating the updated set of parameters of the distributed system comprises:

determining a total CTS across all nodes of the set of nodes.

4. The method of claim 1, further comprising:

selecting a tuple representing a configuration setting of the disaster recovery configuration for the distributed system.

5. The method of claim 4, further comprising:

applying the configuration setting according to the selected tuple.

6. The method of guided distributed services recovery of claim 1, wherein the failure mode is associated with one or more regional failures.

7. A non-transitory computer-readable storage medium comprising computer-readable program code capable of being executed by one or more processors, the computer-readable program code comprising computer-readable instructions configurable to cause:

obtaining, by one or more servers of a multi-tenant database system, for each node of a set of nodes, recovery dependency metadata, each node of the set of nodes representing a corresponding service of services being provided in a cloud computing environment, the recovery dependency metadata indicating one or more services on which the service depends;

generating, by the one or more servers of the multi-tenant database system, an acyclic dependency graph corresponding to the set of nodes using the recovery dependency metadata;

validating, by the one or more servers of the multi-tenant database system using the acyclic dependency graph, that no cyclic dependency exists for the services corresponding to the set of nodes;

modifying, by the one or more servers of the multi-tenant database system, at least one parameter of a set of parameters of a distributed system responsive to an input indication, the set of parameters including a recovery time objective (RTO), a recovery point objective (RPO), and a cost to serve (CTS);

generating, by the one or more servers of the multi-tenant database system, an updated set of parameters of the distributed system based, at least in part, on the modified at least one parameter using the acyclic dependency graph, wherein generating the updated set of parameters includes determining an RPO value for each node of the set of nodes by applying the acyclic dependency graph and setting an updated RPO of the updated set of parameters to a maximum RPO value selected from the determined RPO values;

dynamically, by the one or more servers of the multi-tenant database system, modifying a disaster recovery configuration of the services in the distributed system according to the updated set of parameters such that no cyclic dependency exists for the services corresponding to the set of nodes, wherein the disaster recovery configuration protects against a failure mode during disaster recovery of the services; and calling, by the one or more servers of the multi-tenant database system, an application programming interface of at least one of the one or more services to provide the disaster recovery configuration for implementation.

8. The non-transitory computer-readable storage of claim 7, wherein generating the updated set of parameters of the distributed system comprises:

determining, for each of a plurality of paths of the acyclic dependency graph among the services of the distributed system, a corresponding RTO path value; and selecting the maximum RTO value from the determined RTO path values.

9. The non-transitory computer-readable storage medium of claim 7, wherein generating the updated set of parameters of the distributed system comprises:

determining a total CTS across all nodes of the set of nodes.

10. The non-transitory computer-readable storage medium of claim 7, further comprising computer-readable instructions configurable to cause:

selecting a tuple representing a configuration setting for the distributed system.

11. The non-transitory computer-readable storage medium of claim 10, further comprising computer-readable instructions configurable to cause:

applying the configuration setting according to the selected tuple.

12. The non-transitory computer-readable storage of claim 7, wherein the failure mode is associated with one or more regional failures.

13. A computing system, comprising:

a processor; and a memory, the computing system configurable to cause:

obtaining, by one or more servers of a multi-tenant database system, for each node of a set of nodes, recovery dependency metadata, each node of the set of nodes representing a corresponding service of services being provided in a cloud computing environment, the recovery dependency metadata indicating one or more services on which the service depends;

generating, by the one or more servers of the multi-tenant database system, an acyclic dependency graph corresponding to the set of nodes using the recovery dependency metadata;

validating, by the one or more servers of the multi-tenant database system using the acyclic dependency graph, that no cyclic dependency exists for the services corresponding to the set of nodes;

modifying, by the one or more servers of the multi-tenant database system, at least one parameter of a set of parameters of a distributed system responsive to an input indication, the set of parameters including a recovery time objective (RTO), a recovery point objective (RPO), and a cost to serve (CTS);

generating, by the one or more servers of the multi-tenant database system, an updated set of parameters of the distributed system based, at least in part, on the modified at least one parameter using the acyclic dependency graph, wherein generating the updated set of parameters includes determining an RPO value for each node of the set of nodes by applying the acyclic dependency graph and setting an updated RPO of the updated set of parameters to a maximum RPO value selected from the determined RPO values;

dynamically, by the one or more servers of the multi-tenant database system, modifying a disaster recovery configuration of at least one of the services in the distributed system according to the updated set of parameters such that no cyclic dependency exists for the services corresponding to the set of nodes, wherein the disaster recovery configuration protects against a failure mode during disaster recovery of the services; and calling, by the one or more servers of the multi-tenant database system, an application programming interface of at least one of the one or more services to provide the disaster recovery configuration for implementation.

14. The computing system of claim 13, wherein generating the updated set of parameters of the distributed system comprises:

determining, for each of a plurality of paths of the acyclic dependency graph among the services of the distributed system, a corresponding RTO path value; and selecting the maximum RTO value from the determined RTO path values.

15. The computing system of claim 13, wherein generating the updated set of parameters of the acyclic dependency graph comprises:

determining a total CTS across all nodes of the set of nodes.

16. The computing system of claim 13, further comprising:

selecting a tuple representing a configuration setting of the disaster recovery configuration for the distributed system.

17. The computing system of claim 16, further comprising:

applying the configuration setting according to the selected tuple.

18. The computing system of claim 13, wherein the failure mode is associated with one or more regional failures.

\* \* \* \* \*